United States Patent
Kasterstein et al.

(10) Patent No.: US 9,552,422 B2
(45) Date of Patent: Jan. 24, 2017

(54) SYSTEM AND METHOD FOR DETECTING A SEARCH INTENT

(71) Applicant: Doat Media Ltd., Tel Aviv (IL)

(72) Inventors: Rami Kasterstein, Givataim (IL);
Amihay Ben-David, London (GB);
Joey Joseph Simhon, Ramat-Gan (IL)

(73) Assignee: Doat Media Ltd., Tel Aviv (IL)

( * ) Notice: Subject to any disclaimer, the term of this patent is extended or adjusted under 35 U.S.C. 154(b) by 386 days.

(21) Appl. No.: 14/103,536

(22) Filed: Dec. 11, 2013

(65) Prior Publication Data
US 2014/0101126 A1  Apr. 10, 2014

Related U.S. Application Data

(63) Continuation-in-part of application No. 13/712,563, filed on Dec. 12, 2012, now Pat. No. 9,141,702, which is a continuation-in-part of application No. 13/156,999, filed on Jun. 9, 2011, now Pat. No. 9,323,844, and a continuation-in-part of application No. 13/296,619, filed on Nov. 15, 2011.
(Continued)

(51) Int. Cl.
*G06F 17/30* (2006.01)

(52) U.S. Cl.
CPC ... *G06F 17/30864* (2013.01); *G06F 17/30684* (2013.01); *G06F 17/30716* (2013.01); *G06F 17/30867* (2013.01)

(58) Field of Classification Search
CPC .............. H04L 67/306; G06F 17/30905; G06F 17/30716; G06F 17/30867; G06F 17/30864; G06F 17/30684; G06F 3/0482; G06F 3/04817; G06F 3/04847
USPC ................................ 715/205, 206; 707/706
See application file for complete search history.

(56) References Cited

U.S. PATENT DOCUMENTS 5,911,043 A   6/1999  Duffy et al.
6,101,529 A   8/2000  Chrabaszcz
(Continued)

OTHER PUBLICATIONS

*Alice Corp v. CLS Bank International*, 573 US , 134 S. CT. 2347 (2014).
(Continued)

*Primary Examiner* — Evan Aspinwall
(74) *Attorney, Agent, or Firm* — M&B IP Analysts, LLC

(57) ABSTRACT

A method and system for detecting a search intent of a user are provided. The method includes receiving an input search query from a user device; tokenizing the input search query to at least one token to create at least one tokenized query; processing the at least one tokenized query by a plurality of engines, wherein each engine of the plurality of engines configured to compute a certainty score that indicates a probability that the at least one tokenized query is mapped to at least one entity, wherein each engine of the plurality of engines is further configured to correspond to at least one entity indicating a topic of interest, thereby the plurality of engines are configured with different entities; receiving from a set of engines of the plurality of engines their respective entities and computed certainty scores, wherein the set of engines output computed certainty scores above a predefined threshold; and analyzing the received certainty scores and the respective entities to determine the search intent.

18 Claims, 3 Drawing Sheets

Related U.S. Application Data

(60) Provisional application No. 61/822,376, filed on May 12, 2013, provisional application No. 61/653,562, filed on May 31, 2012, provisional application No. 61/468,095, filed on Mar. 28, 2011, provisional application No. 61/354,022, filed on Jun. 11, 2010.

(56) References Cited

U.S. PATENT DOCUMENTS

| | | |
|---|---|---|
| 6,484,162 B1 | 11/2002 | Edlund et al. |
| 6,564,213 B1 | 5/2003 | Ortega et al. |
| 6,605,121 B1 | 8/2003 | Roderick |
| 7,266,588 B2 | 9/2007 | Oku |
| 7,302,272 B2 | 11/2007 | Ackley |
| 7,376,594 B2 | 5/2008 | Nigrin |
| 7,461,061 B2 | 12/2008 | Aravamudan et al. |
| 7,529,741 B2 | 5/2009 | Aravamudan et al. |
| 7,533,084 B2 | 5/2009 | Holloway et al. |
| 7,565,383 B2 | 7/2009 | Gebhart et al. |
| 7,599,925 B2 | 10/2009 | Larson et al. |
| 7,636,900 B2 | 12/2009 | Xia |
| 7,774,003 B1 | 8/2010 | Ortega et al. |
| 7,792,815 B2 | 9/2010 | Aravamudan et al. |
| 7,797,298 B2 | 9/2010 | Sareen et al. |
| 7,958,141 B2 | 6/2011 | Sundaresan et al. |
| 7,966,321 B2 | 6/2011 | Wolosin et al. |
| 7,974,976 B2 | 7/2011 | Yahia et al. |
| 8,032,666 B2 | 10/2011 | Srinivansan et al. |
| 8,073,860 B2 | 12/2011 | Venkataraman et al. |
| 8,086,604 B2 | 12/2011 | Arrouye et al. |
| 8,271,333 B1 | 9/2012 | Grigsby et al. |
| 8,312,484 B1 | 11/2012 | McCarty et al. |
| 8,571,538 B2 | 10/2013 | Sprigg et al. |
| 8,606,725 B1 | 12/2013 | Agichtein et al. |
| 8,718,633 B2 | 5/2014 | Sprigg et al. |
| 8,793,265 B2 | 7/2014 | Song et al. |
| 8,799,273 B1 | 8/2014 | Chang et al. |
| 8,843,853 B1 | 9/2014 | Smoak et al. |
| 2004/0186989 A1 | 9/2004 | Clapper |
| 2004/0229601 A1 | 11/2004 | Zabawskyj et al. |
| 2005/0071328 A1 | 3/2005 | Lawrence |
| 2005/0076367 A1 | 4/2005 | Johnson et al. |
| 2005/0102407 A1 | 5/2005 | Clapper |
| 2005/0108406 A1 | 5/2005 | Lee et al. |
| 2005/0149496 A1 | 7/2005 | Mukherjee et al. |
| 2005/0283468 A1 | 12/2005 | Kamvar et al. |
| 2006/0031529 A1 | 2/2006 | Keith |
| 2006/0064411 A1 | 3/2006 | Gross et al. |
| 2006/0136403 A1 | 6/2006 | Koo |
| 2006/0206803 A1 | 9/2006 | Smith |
| 2006/0224593 A1 | 10/2006 | Benton et al. |
| 2006/0248062 A1 | 11/2006 | Libes et al. |
| 2006/0277167 A1 | 12/2006 | Gross et al. |
| 2007/0011167 A1 | 1/2007 | Krishnaprasad et al. |
| 2007/0082707 A1 | 4/2007 | Flynt et al. |
| 2007/0112739 A1 | 5/2007 | Burns et al. |
| 2007/0174900 A1 | 7/2007 | Marueli et al. |
| 2007/0204039 A1 | 8/2007 | Inamdar |
| 2007/0239724 A1* | 10/2007 | Ramer ............. G06F 17/30864 |
| 2007/0255831 A1 | 11/2007 | Hayashi et al. |
| 2007/0300185 A1 | 12/2007 | Macbeth et al. |
| 2008/0065685 A1 | 3/2008 | Frank |
| 2008/0114759 A1* | 5/2008 | Yahia ..................... G06Q 30/02 |
| 2008/0256443 A1 | 10/2008 | Li et al. |
| 2009/0049052 A1 | 2/2009 | Sharma et al. |
| 2009/0070318 A1 | 3/2009 | Song et al. |
| 2009/0077047 A1 | 3/2009 | Cooper et al. |
| 2009/0125482 A1 | 5/2009 | Peregrine et al. |
| 2009/0210403 A1 | 8/2009 | Reinshmidt et al. |
| 2009/0234814 A1 | 9/2009 | Boerries et al. |
| 2009/0239587 A1 | 9/2009 | Negron et al. |
| 2009/0240680 A1 | 9/2009 | Tankovich et al. |
| 2009/0277322 A1 | 11/2009 | Cai et al. |
| 2009/0327261 A1 | 12/2009 | Hawkins |
| 2010/0042912 A1 | 2/2010 | Whitaker |
| 2010/0082661 A1 | 4/2010 | Beaudreau |
| 2010/0094854 A1 | 4/2010 | Rouhani-Kalleh |
| 2010/0106706 A1 | 4/2010 | Rorex et al. |
| 2010/0257552 A1 | 10/2010 | Sharan et al. |
| 2010/0268673 A1 | 10/2010 | Quadracci |
| 2011/0072492 A1 | 3/2011 | Mohler et al. |
| 2011/0078767 A1 | 3/2011 | Cai et al. |
| 2011/0093488 A1 | 4/2011 | Amacker et al. |
| 2011/0131205 A1 | 6/2011 | Iyer et al. |
| 2011/0252329 A1 | 10/2011 | Broman |
| 2011/0314419 A1 | 12/2011 | Dunn et al. |
| 2012/0198347 A1 | 8/2012 | Hirvonen et al. |
| 2013/0132896 A1 | 5/2013 | Lee et al. |

OTHER PUBLICATIONS

Notice of the First Office Action for Chinese Patent Application No. 201280004300.6, State Intellectual Property Office of the P.R.C., dated Oct. 26, 2016.

* cited by examiner

SYSTEM AND METHOD FOR DETECTING A SEARCH INTENT

CROSS-REFERENCE TO RELATED APPLICATIONS

This application claims the benefit of U.S. provisional application No. 61/822,376 filed on May 12, 2013, and is a continuation-in-part of U.S. patent application Ser. No. 13/712,563 filed on Dec. 12, 2012. The Ser. No. 13/712,563 application claims the benefit of U.S. provisional patent application No. 61/653,562 filed on May 31, 2012, and is a continuation-in-part application of U.S. patent application Ser. No. 13/156,999 filed on Jun. 9, 2011, which claims the benefit of U.S. provisional patent application No. 61/468,095 filed Mar. 28, 2011 and U.S. provisional application No. 61/354,022 filed Jun. 11, 2010. The Ser. No. 13/712,563 application is also a continuation-in-part application of U.S. patent application Ser. No. 13/296,619 filed on Nov. 15, 2011. The contents of the above-referenced applications are incorporated herein by reference.

TECHNICAL FIELD

The invention generally relates to search engines for providing one or more search results respective of a query received from a user, and more specifically to a system and methods for detecting user intent with respect to a query.

BACKGROUND

Search engines are used to search for information over the World Wide Web. A web search query refers to a query that a user enters into a web search engine in order to receive search results.

A query received from a user device may be explicit or implicit in different levels. An implicit query makes it complicated to provide appropriate search results to the user because the user intent behind such queries is unclear. As an example, if the input query is "Madonna clips" it is unclear whether the user is interested in listening to the entertainer Madonna's music clips, viewing Madonna's video clips, or downloading Madonna's music or video clips to the user's device.

It would therefore be advantageous to provide a solution that overcomes the limitations of the prior art.

SUMMARY

Certain exemplary embodiments include a computerized method for detecting a search intent of a user. The method comprises receiving an input search query from a user device; tokenizing the input search query to at least one token to create at least one tokenized query; processing the at least one tokenized query by a plurality of engines, wherein each engine of the plurality of engines is configured to compute a certainty score that indicates a probability that the at least one tokenized query is mapped to at least one entity, wherein each engine of the plurality of engines is further configured to correspond to at least one entity indicating a topic of interest, thereby the plurality of engines are configured with different entities; receiving from a set of engines of the plurality of engines their respective entities and computed certainty scores; and analyzing the received certainty scores and the respective entities to determine the search intent.

Certain exemplary embodiments also include an apparatus for detecting a search intent of a user. The apparatus comprises an interface configured to receive an input search query from a user device over a network; a tokenizer configured to tokenize the input search query to at least one token to create at least one tokenized query; a plurality of engines, wherein each engine of the plurality of engines is configured to compute a certainty score that indicates a probability that the at least one tokenized query is mapped to at least one entity, wherein each engine of the plurality of engines is further configured to include at least one entity indicating a topic of interest, thereby the plurality of engines are configured with different entities; an analyzer configured to receive from a set of engines of the plurality of engines their respective entities and computed certainty scores, wherein the analyzer is further configured to determine the search intent using the received certainty scores and the respective entities to determine the search intent; and a memory for saving at least the tokenized queries and the determined search intent.

BRIEF DESCRIPTION OF THE DRAWINGS

The subject matter that is disclosed herein is particularly pointed out and distinctly claimed in the claims at the conclusion of the specification. The foregoing and other objects, features and advantages of the disclosed embodiments will be apparent from the following detailed description taken in conjunction with the accompanying drawings.

DETAILED DESCRIPTION

Figure 1:
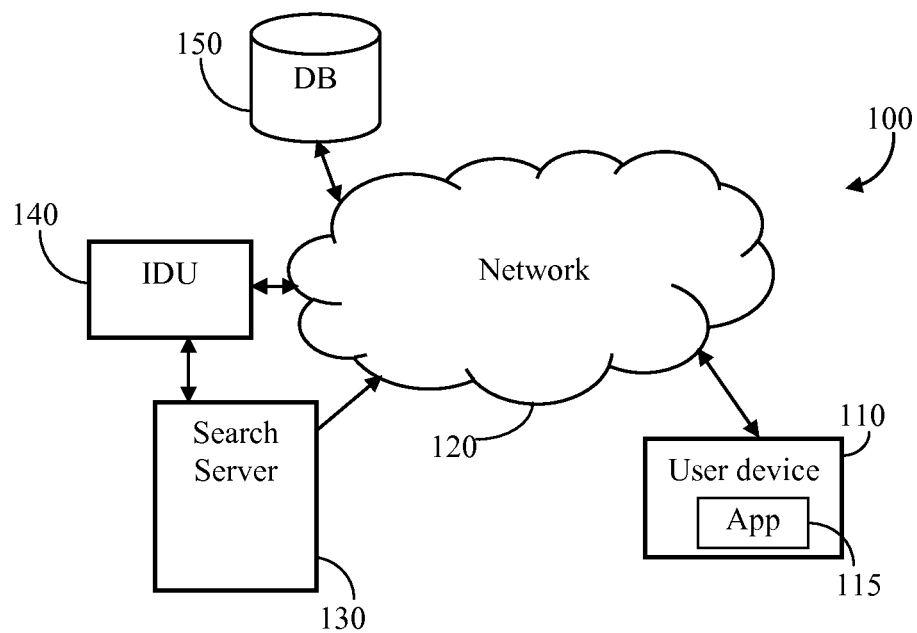
FIG. 1 is a schematic diagram of a system utilized to describe the various embodiments disclosed herein.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

According to exemplary embodiments disclosed herein, a system and method for detecting the search intent of users based on queries entered by the users are provided. An input query is received from a user device. The input query is tokenized into at least one tokenized query that is then processed by a plurality of engines. Each engine of the plurality of engines computes the probability that a tokenized query is mapped to an entity. An entity defines a topic of interest. Each of the plurality of engines provides an entity together with a certainty score. The intent is then determined based on the certainty score received from each of the plurality of engines.

FIG. 1 depicts an exemplary and non-limiting schematic diagram of a system 100 utilized for describing certain embodiments disclosed herein. A user device 110 is connected to a network 120. The network 120 may be, but is not limited to, a local area network (LAN), a wide area network (WAN), a metro area network (MAN), the world wide web (WWW), the Internet, a wired network, a wireless network, etc., as well as any combination thereof.

The user device 110 is configured to submit queries to a search server 130 which is also connected to the network 120. The search server 130 is configured to send and receive queries to and from an intent detection unit (IDU) 140. The IDU 140 is configured to determine the search intent of a user of the user device 110 respective of an input query or part of the input query.

The search intent represents the type of content, the content, and/or actions that may be of interest to the user during a current time period. For example, the search intent may represent the user's desire to view a clip, download the clip, or listen to the clip. Further, the search intent provides which song or performer the intent is directed to. In an embodiment, the IDU 140 is further configured to send the determined search intent to the search server 130. In one embodiment, the IDU 140 may be integrated in the search server 130 or communicatively connected to the server 130.

With this aim, according to one embodiment, the IDU 140 tokenizes a received query and analyzes the tokens via use of a plurality of engines. Each engine is configured to handle a certain topic of interest so that each engine of the plurality of engines handles different one or more topics. Upon determination of the search intent, the search server 130 can provide one or more search results respective of the query and the user intent. To this end, the search server 130 uses the search intent to query one or more resources from a plurality of resources that are the most appropriate to fulfill the search intent of the user. The resources may include, but are not limited to, a plurality of web search engines, servers of content providers, vertical comparison engines, servers of content publishers, native content installed on the user device, and so on. The query provided by the search server 130 is generated, in part, respective of the determined intent, or variations thereof, to a resource in a communication format that is proper for that specific resource, thereby enabling search of such resources that require a customized interface to perform any kind of successful processing.

The system 100 may further include a database 150 for storing information such as prior user intents, prior queries received from users, semantic and statistic data for enhancing the search experience, and so on. The system 100 may further include an agent 115 installed locally on the user device 110. The agent 115 is configured to facilitate the communication with the search server 130. In an embodiment, the agent 115 is realized as an application (mobile app), where instructions of such an application are saved in a memory and executed by a processor of the user device 110. It should be noted that the one user device 110 is illustrated in FIG. 1 only for the sake of simplicity and without limitation on the generality of the disclosed embodiments.

Figure 2:
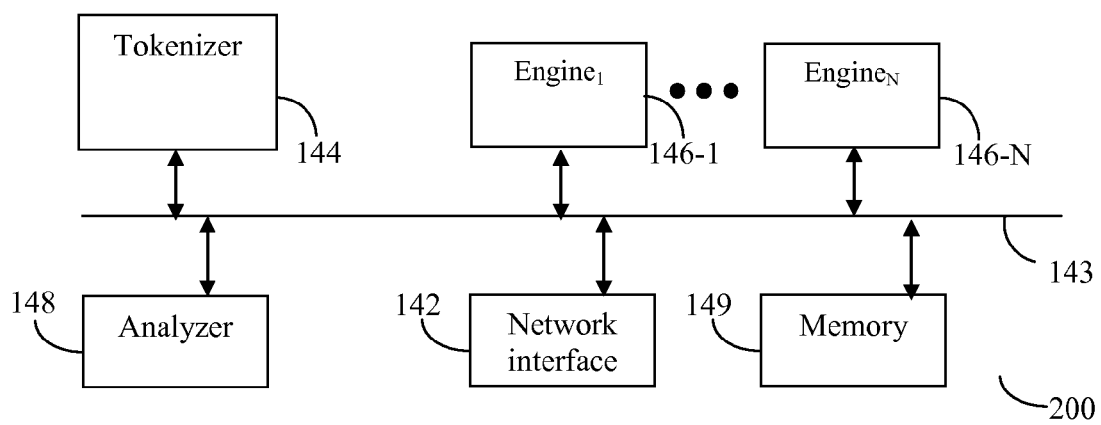
FIG. 2 is a schematic block diagram of an intent detection unit (IDU) for detecting a search intent of a user according to an embodiment.

FIG. 2 depicts an exemplary and non-limiting schematic diagram 200 of the IDU 140 according to an embodiment. The IDU 140 includes a network interface 142, a tokenizer 144, a plurality of engines 146-1 through 146-N, an analyzer 148, and a memory 149. The network interface 142 provides connectivity to the network 120 and is configured to receive queries from the search server 130 or directly from a user device 110. The network interface 142 may further be used to communicate with the database 150 to retrieve information therefrom. The elements of the IDU 140 are communicatively coupled using a communication bus 143.

The tokenizer 144 is configured to tokenize an input query to units of information (tokens). The tokenizer 144 arranges the tokens in tokenized paths to enable efficient processing by the engine 146. Each token may be, but is not limited to, a word or a series of words, or a number or a series of numbers. According to one embodiment, the tokenizer 144 may also include a filtering unit (not shown) for filtering the input query. The input queries can be classified into three different types of queries: definitive, fuzzy, and noisy. A definitive query is short and mapped to known entities or keywords. A fuzzy query contains a combination of known entities and keywords that are not correlated to the known entities. Noisy queries cannot be mapped to known entities, or are long and complex. According to the disclosed embodiments, an entity is an "object" in the world that can be defined with known types and attributes. Entities may be, for example, products, people, locations, companies, music bands, popular keywords, applications, zip codes, and query components. Each entity can be associated with one or more classifications describing its essence. For example, an entity 'Madonna' can be associated with the classifications singer, actor, and celebrity.

The filtering process is designed to simplify at least fuzzy and noisy queries. The filtering process may include removing one or more unnecessary tokens (such as preposition words) from the query. As an example, if the received query is "where there in Tolsa", the word "in" may be removed from the query if the token is determined to be unnecessary. A list of unnecessary tokens is defined in a semantic dictionary maintained in the database 150 or the memory 149.

The tokenized paths created by the tokenizer 144 are based on the fact that the coherent query typically includes a set of tokens (map to entities as defined above) that represent similar intents. According to one embodiment, any ambiguity between paths is resolved by using the most coherent and probable path among all possible tokenized paths. In one embodiment, a graph of connections between entities (e.g., singers connected to their songs) is utilized to evaluate the likelihood of a certain tokenized paths yielding the user's intended search result based on the connection of tokens (mapped to entities) in the same query. For example, the input query "madonna vogue" includes two tokens: "madonna" and "vogue", where the tokenized path is that the entire query deals with music, rather than a Vogue magazine article ("Vogue" is both the name of a Madonna song and the title of a magazine).

Each engine of the plurality of engines 146 is configured to handle different one or more topics of interest. In one embodiment, a set of engines 146 are configured to map input tokenized paths or tokens (hereinafter tokenized queries) to entities. As noted above, entities are objects that can be defined using a set of attributes such as consumer goods, locations, keywords, mobile applications (apps), person names, questions, URLs, and so on.

As a non-limiting example, an engine 146 that is configured to handle locations, search for place names (cities, states, countries) in the tokenized query, and compute the probability that the user added a location to his or her input query. As another non-limiting example, an engine 146 that handles the names of people computes the probability that a given n-gram in the tokenized query is the name of an unknown person. Such an engine uses a frequency dictionary for common names versus common words, and common last name suffixes. In the fields of computational linguistics and probability, an n-gram is a contiguous sequence of n items from a given sequence of text or speech.

As another non-limiting example, an engine 146 that handles URLs is configured to include a list of URLs, domain names, and websites, and to compute the probability that the tokenized query includes a website name. As another non-limiting example, an engine 146 computes the probability that the tokenized query includes a question word, thereby determining the probability that the entire input query is a question. This is performed using pattern matching.

According to one embodiment, the probability may be computed based on at least one of: the frequency of appearance of the tokenized query within the entities by the engines, the correlation of the tokenized query to the entities, the matching between each of the tokens to the entities, the matching of the tokenized query to a plurality of search results received from an external search engine, the correlation to trend reports, and combinations thereof. As noted above, entities represent topics of interests.

The engines 146 are periodically updated with relevant content and are therefore consistent with the trends related to the respective topics. As a non-limiting example, the entities are updated by periodically downloading an index of entities from external sources (e.g., freebase.org) and names related mobile apps that can be periodically downloaded from central repositories of such applications, e.g., AppStore®.

In one embodiment, trends or popularity reports of certain keywords or queries are retrieved from external sources. Such reports can be input to engines 146 and can be utilized in part to compute the probability of a certain entity. For example, a trend report shows that a keyword "JFK airport" is currently trendy, so the probability computed for the location JFK airport would be higher than the probability computed for the person President John F. Kennedy.

Each engine of the plurality of engines 146 then provides an output respective of the tokenized query. Such output includes the mapped entity from the engine 146 and a certainty score for the tokenized query based on the probability computed for the entity handled by a respective engine. That is, each certainty score reflects the matching of the tokenized query to the topic which the corresponding engine handles. In an exemplary embodiment, the certainty score is an integer number between 0 and 10. In one embodiment, a certainty score that does not exceed a predefined threshold is not output by the engine 146.

The outputs of the engines 146 are then analyzed by an analyzer 148 and the search intent is determined respective to the analysis. The analysis of the analyzer 148 may include: a statistical analysis, a semantic analysis, analysis of the user experience, and combinations thereof. The statistical analysis determines the co-occurrence of the tokens within the topics of interest of the engine. The semantic analysis determines at least one of: the type of each of the one or more tokens, the correlation between each of the tokens and the topic of interest of the engine, and a combination thereof.

The statistical analysis is performed to determine, based on the certainty scores, which entities would best describe the search intent of an input query. This may include statistically combining the outputs from engines 146. In another embodiment, the statistical analysis including computing an average over the received certainty scores and considering entities with certainty scores over the computed average. The semantic analysis determines which of the combination of tokens mapped to entities describes a coherent query (or phrase).

The user intent is then sent to the search server 130 in order to provide the user with appropriate search results. It should be noted that each of the units may include a processor coupled to a memory (both are not shown).

As a non-limiting example, the words "March madness" are received as a query by the network interface 142. The query is tokenized by the tokenizer 144 to the tokenized queries "March", "madness" and "March madness". The tokenized queries are then sent to a plurality of engines 146. An engine (e.g., engine 146-1) that handles dates will provide a high certainty score (e.g., 10) for the word "March" and the certainty of this word as the 3rd Month of the year, but this engine 146-1 will not provide an output for the tokenized queries "madness" and "March Madness" (or otherwise provide a certainty score below a predefined threshold). An engine (e.g., engine 146-2) that handles a music entity will provide a high certainty score (e.g., 7) for the word "madness" and the certainty of this word as the name of a Music band, but engine 146-2 will not provide an output for the tokenized queries "March" and "March Madness." An engine (e.g., engine 146-3) that handles basketball will output a high certainty score (e.g., 10) for the tokenized query "March Madness" and the certainty of this combination of words as a basketball related phrase. Respective thereto the search intent is determined to be basketball, as a coherent query is comprised of entities that best represent the intent.

Figure 3:
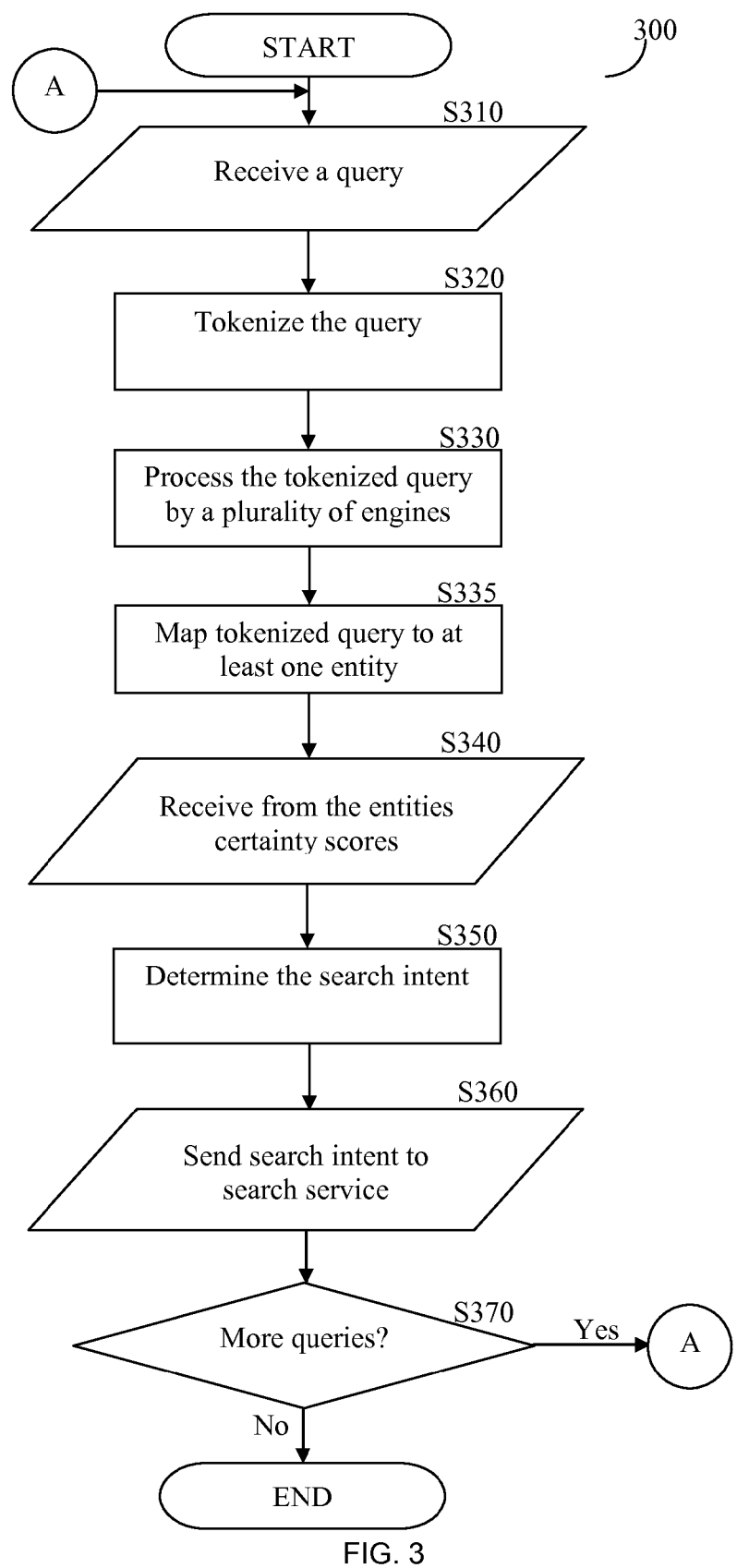
FIG. 3 is a flowchart describing the operation of detecting a search intent of a user according to an embodiment.

FIG. 3 depicts an exemplary and non-limiting flowchart 300 of a method for detecting a search intent of a user submitting a search query according to one embodiment. In S310, a query, or a portion thereof, is received from a user device, for example the user device 110. The input query can be a text query or a voice query, wherein a text query would include a free text query and a structured query. In an embodiment, the user device is a hand held device. Therefore, in that embodiment, the user tends to type shorter queries as it is often inconvenient to type long phrases using hand held devices.

In S320, the received query is tokenized to one or more tokenized queries. A tokenized query may be any combination of tokens broken from the input query. A token may be a word or phrase that appears in the input query. In an embodiment, S320 is performed by the tokenizer 146. In S330, the tokenized queries are input to the plurality of engines 146-1 through 146-N. In S335, each engine computes the probability that a tokenized query is mapped to at least entity that the engine is configured with. An entity represents a topic of interest. Various examples of engines and their entities are discussed above. The probability computation is realized by a certainty score. In S340, each of the engines 146-1 through 146-N provides at least one entity together with a certainty score. As an example, the tokenized query 'madonna' can be mapped to the entities: 'musician' and 'religious figure.' As noted above, in an embodiment, certainty scores below a predefined threshold are not output by the engines. In S350, at least a statistical analysis, a semantic analysis, or both is performed on at least the certainty scores and entities received from the engines to determine the search intent of the user. In S360, the determined search intent is returned to a search server. In an embodiment, the tokenized queries and the search intent are saved in the memory 149. In S370, it is checked whether a new query is received, and if so execution continues with S310; otherwise, execution terminates.

The various embodiments may be implemented as hardware, firmware, software, or any combination thereof. Moreover, the software is preferably implemented as an application program tangibly embodied on a program storage unit or tangible computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers maybe combined into one or more integrated servers. Furthermore, a non-transitory computer readable medium is any computer readable medium except for a transitory propagating signal.

All examples and conditional language recited herein are intended for pedagogical purposes to aid the reader in understanding the principles and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computerized method for detecting a search intent of a user, comprising:
    receiving an input search query from a user device;
    tokenizing the input search query to at least one token to create at least one tokenized query;
    processing the at least one tokenized query by a plurality of engines, wherein each engine of the plurality of engines configured to compute a certainty score that indicates a probability that the at least one tokenized query is mapped to at least one entity, wherein each engine of the plurality of engines is further configured to correspond to at least one entity indicating a topic of interest, thereby the plurality of engines are configured with different entities;
    receiving from a set of at least two engines of the plurality of engines their respective entities and computed certainty scores, wherein the set of engines output computed certainty scores above a predefined threshold; and
    analyzing the received certainty scores and the respective entities to determine the search intent.

2. The computerized method of claim 1, wherein analyzing the received certainty scores and the respective entities includes at least one of: a statistical analysis, and a semantic analysis of the received certainty scores and the respective entities to determine which combination of the entities result in a coherent query.

3. The computerized method of claim 1, wherein an entity of the plurality of entities defines any one of: product names, person names, locations, company names, names of music bands, popular keywords, applications, zip codes, and query components.

4. The computerized method of claim 1, further comprising:
    filtering out words from the input search query words that are included in a predefined semantic dictionary.

5. The computerized method of claim 1, wherein a token is any one of:
    a word, a series of words, a number, and a series of numbers.

6. The computerized method of claim 1, wherein the computation of a certainty score by an engine is based on at least one of: a frequency of appearance of the tokenized query within the least one entity that the engine is configured with, a correlation of the tokenized query to the least one entity that the engine is configured with, a match between each of the tokens and the least one entity that the engine is configured with, and a match of the tokenized query to a plurality of search results received from a search engine.

7. The computerized method of claim 1, wherein the input search query is any one of: a free text query, a structured query, and a voice query.

8. The computerized method of claim 1, wherein tokenizing an input search query further comprises:
    determining a most coherent tokenized path based on one or more similarities of intent shared among the at least one token.

9. A non-transitory computer readable medium having stored thereon instructions for causing one or more processing units to execute the method according to claim 1.

10. The apparatus of claim 9, wherein the tokenizer is further configured to:
    determine a most coherent tokenized path based on one or more similarities of intent shared among the at least one token.

11. An apparatus for detecting a search intent of a user, comprising:
    a processor;
    an interface configured to receive an input search query from a user device over a network;
    a tokenizer configured to tokenize the input search query to at least one token to create at least one tokenized query;
    a plurality of engines, wherein each engine of the plurality of engines configured to compute a certainty score that indicates a probability that the at least one tokenized query is mapped to at least one entity, wherein each engine of the plurality of engines is further configured to include at least one entity indicating a topic of interest, thereby the plurality of engines are configured with different entities;
    an analyzer configured to receive from a set of at least two engines of the plurality of engines their respective entities and computed certainty scores, wherein the set of engines output computed certainty scores above a predefined threshold, wherein the analyzer is further configured to determine the search intent using the received certainty scores and the respective entities to determine the search intent; and
    a memory for saving at least the tokenized queries and the determined search intent.

12. The apparatus of claim 11, wherein the analyzer is further configured to perform at least one of: a statistical analysis, and a semantic analysis of the received certainty scores and the respective entities to determine which combination of the entities results in a coherent query.

13. The apparatus of claim 11, wherein an entity of the plurality of entities defines any one of: product names, person names, locations, company names, names of music bands, popular keywords, applications, zip codes, and query components.

14. The apparatus of claim 11, wherein the tokenizer is further configured to filter out words from the input search query words that are included in a predefined semantic dictionary.

15. The apparatus of claim 11, wherein a token is any one of: a word, a series of words, a number, and a series of numbers.

16. The apparatus of claim 11, wherein the computation of a certainty score by an engine is based on at least one of: a frequency of appearance of the tokenized query within the least one entity that the engine is configured with, a correlation of the tokenized query to the least one entity that the engine is configured with, a match between each of the tokens and the least one entity that the engine is configured with, and a match of the tokenized query to a plurality of search results received from a search engine.

17. The apparatus of claim 11, wherein the input search query is any one of: a free text query, a structured query, and a voice query.

18. The apparatus of claim 12, wherein the tokenizer is further configured to determine a most coherent tokenized path based on one or more similarities of intent shared among the at least one token.

* * * * *